(12) United States Patent
Zavesky et al.

(10) Patent No.: US 10,769,667 B2
(45) Date of Patent: Sep. 8, 2020

(54) BILLBOARD-BASED ADVERTISING SYSTEM

(71) Applicant: AT&T INTELLECTUAL PROPERTY I, L.P., Atlanta, GA (US)

(72) Inventors: Eric Zavesky, Austin, TX (US); Simon D. Byers, Summit, NJ (US); Brian Amento, Port Murray, NJ (US); Kermit Hal Purdy, Bernardsville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 793 days.

(21) Appl. No.: 15/333,881

(22) Filed: Oct. 25, 2016

(65) Prior Publication Data

US 2018/0114251 A1 Apr. 26, 2018

(51) Int. Cl.
| | |
|---|---|
| *G06Q 30/00* | (2012.01) |
| *G06Q 30/02* | (2012.01) |
| *G06K 9/00* | (2006.01) |
| *H04N 7/18* | (2006.01) |
| *H04N 21/222* | (2011.01) |

(52) U.S. Cl.
CPC ..... *G06Q 30/0265* (2013.01); *G06K 9/00785* (2013.01); *G06K 9/00832* (2013.01); *G06Q 30/0269* (2013.01); *H04N 7/18* (2013.01); *H04N 21/2223* (2013.01); *G06K 2209/15* (2013.01)

(58) Field of Classification Search
None
See application file for complete search history.

(56) References Cited

U.S. PATENT DOCUMENTS

| | | | |
|---|---|---|---|
| 7,386,394 B2 | 6/2008 | Shulman | |
| 7,466,841 B2 | 12/2008 | Bahlmann et al. | |
| 8,315,456 B2 | 11/2012 | Hicks et al. | |
| 8,682,714 B2 | 3/2014 | Smith et al. | |
| 10,230,705 B1* | 3/2019 | Joshi | H04L 63/107 |
| 2002/0034384 A1 | 3/2002 | Mikhail et al. | |
| 2008/0049020 A1* | 2/2008 | Gusler | G06F 3/012 |
| | | | 345/427 |
| 2010/0057572 A1 | 3/2010 | Scheibe et al. | |
| 2013/0060642 A1 | 3/2013 | Shlomot et al. | |
| 2013/0080242 A1* | 3/2013 | Alhadeff | G06Q 30/0239 |
| | | | 705/14.39 |
| 2013/0346205 A1* | 12/2013 | Hogg | H04L 51/20 |
| | | | 705/14.58 |

(Continued)

*Primary Examiner* — Kambiz Abdi
*Assistant Examiner* — Christopher Stroud
(74) *Attorney, Agent, or Firm* — Guntin & Gust, PLC; John G. Rauch

(57) ABSTRACT

Aspects of the subject disclosure may include, for example, a processing system including a processor and a memory that stores executable instructions that, when executed by the processing system, facilitate performance of operations, including detecting a vehicle, obtaining a demographic profile for an occupant of the vehicle, obtaining a directed advertisement for the vehicle based on the demographic profile of the occupant, generating a message for the vehicle based on the directed advertisement, and broadcasting the message to the vehicle, wherein an on-board device of the vehicle receives the message. Other embodiments are disclosed.

20 Claims, 10 Drawing Sheets

(56) References Cited

U.S. PATENT DOCUMENTS

| | | | |
|---|---|---|---|
| 2014/0334684 A1* | 11/2014 | Strimling | G06K 9/00771 |
| | | | 382/105 |
| 2015/0081452 A1 | 3/2015 | Anthony | |
| 2015/0227965 A1 | 8/2015 | Drysch et al. | |
| 2015/0248498 A1* | 9/2015 | Han | G06Q 30/0271 |
| | | | 235/375 |
| 2015/0294347 A1 | 10/2015 | Placide | |
| 2016/0110759 A1* | 4/2016 | Polehn | G06Q 30/0251 |
| | | | 705/14.49 |
| 2016/0182820 A1* | 6/2016 | Borthakur | H04N 5/23229 |
| | | | 348/207.1 |
| 2016/0328730 A1* | 11/2016 | Salamon | G06Q 30/0207 |

* cited by examiner

300

810

830

910

930

950

1000

US 10,769,667 B2

BILLBOARD-BASED ADVERTISING SYSTEM

FIELD OF THE DISCLOSURE

The subject disclosure relates to a billboard based advertising system.

BACKGROUND

Roadside billboards can generally only present one image at a time.

BRIEF DESCRIPTION OF THE DRAWINGS

Reference will now be made to the accompanying drawings, which are not necessarily drawn to scale, and wherein.

DETAILED DESCRIPTION

The subject disclosure describes, among other things, illustrative embodiments for providing an advertising system that can provide targeted ad content while still providing an overall main advertising message. Other embodiments are described in the subject disclosure.

One or more aspects of the subject disclosure include a processing system including a processor and a memory that stores executable instructions that, when executed by the processing system, facilitate performance of operations, including detecting a vehicle, obtaining a demographic profile for an occupant of the vehicle, obtaining a directed advertisement for the vehicle based on the demographic profile of the occupant, generating a message for the vehicle based on the directed advertisement, and broadcasting the message to the vehicle, wherein an on-board device of the vehicle receives the message.

One or more aspects of the subject disclosure include a method that includes obtaining, by a processing system comprising a processor, images of a traffic flow near a billboard, wherein the billboard presents a first image, identifying, by the processing system, a vehicle in the traffic flow, generating, by the processing system, a marketing profile for an occupant of the vehicle according to marketing parameters for the occupant, generating, by the processing system, directed advertisement for the occupant according to the marketing profile, and generating, by the processing system, a second image to be displayed on the billboard, wherein the second image includes a code to be obtained by the vehicle, wherein equipment of the vehicle observes the code and receives the directed advertisement based on the code and presents the directed advertisement to occupants of the vehicle.

One or more aspects of the subject disclosure include a machine-readable storage medium, comprising executable instructions that, when executed by a processing system including a processor, facilitate performance of operations including receiving first image data from a first billboard including an image of a vehicle in a viewing position of the first billboard, wherein the first billboard comprises a first camera unit to record the first image data, analyzing the image of the vehicle to determine a marketing profile for the vehicle, determining a first directed marketing message for the vehicle according to the marketing profile, and providing the first directed marketing message to the first billboard, wherein the first billboard provides a message to the vehicle to access the first directed marketing message via equipment of the vehicle.

Figure 1:
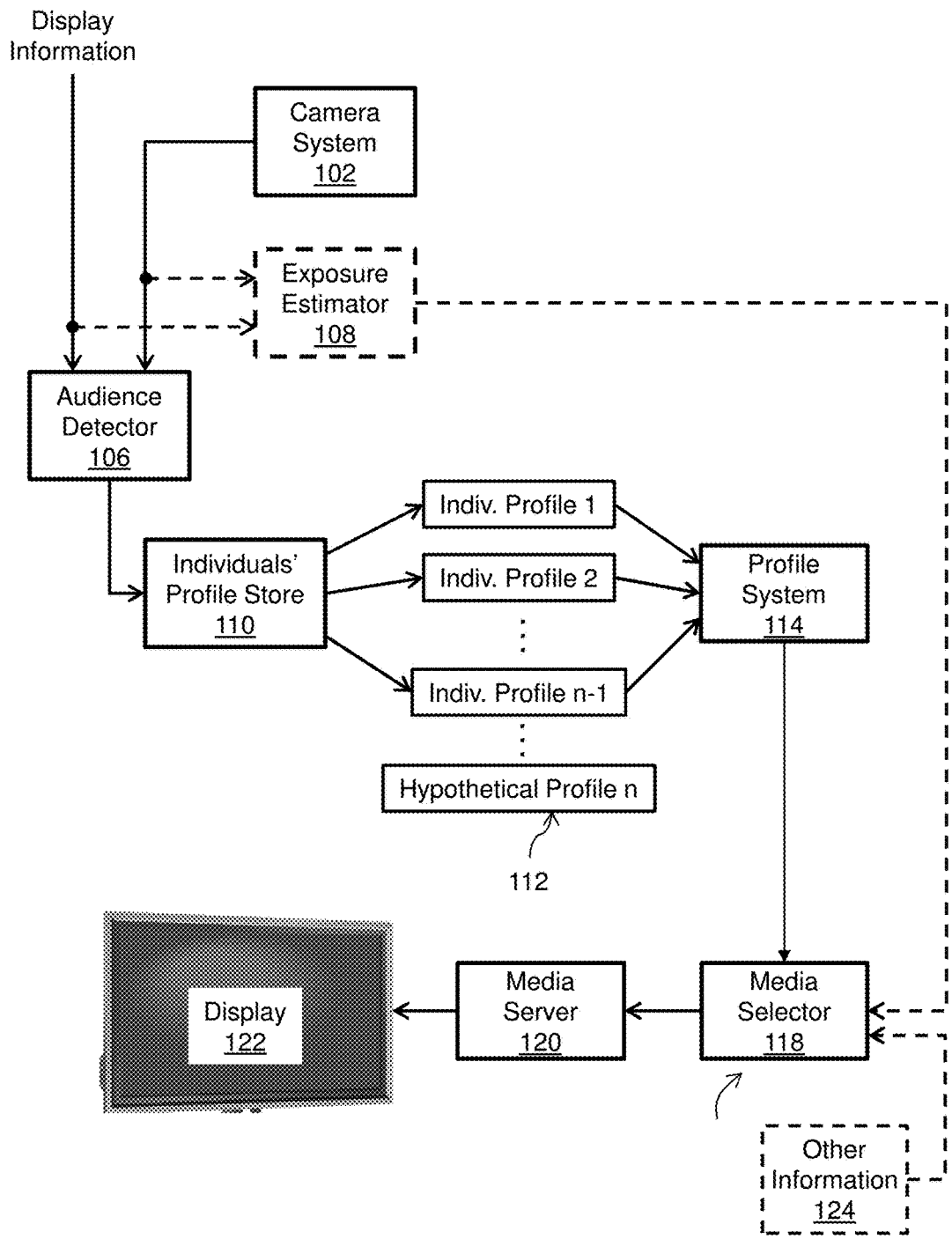
FIG. 1 depicts an illustrative embodiment of system 100.

FIG. 1 depicts an illustrative embodiment of a target billboard system 100 that selects targeted vehicles and can provide directed advertising or marketing material to the targeted vehicles at a media presentation device, e.g., a digital billboard 122 as part of a targeted billboard. Exemplarily, the system 100 would provide a two-tier advertising platform. In a first platform, the targeted billboard can provide a main advertisement for the general public, including a traffic stream that can view the targeted billboard. As a second platform, the targeted billboard can provide a second set of directed advertising or marketing material to target vehicles. The second platform can be a visual code provided through the digital billboard 122, for example. Thus, in some embodiments, the digital billboard 122 can be provided alone to provide a main image and secondary images. That is, the targeted billboard is made up only of the digital billboard 122. In other embodiments, the billboard itself can be static or a rotating set of images along with a digital billboard 122 that provides additional content, including the directed advertising or marketing materials.

Exemplarily, targeted billboard system 100 exemplarily includes a camera system 102. The camera system 102 can view traffic as a traffic flow faces the targeted billboard. Exemplarily, the camera system 102 can pick out individual vehicles. In addition, the camera system 102 can also visually identify drivers and passengers in the vehicles. The camera system can exemplary communicate with an audience detector 106 that can parse images from the camera system 102 to determine target vehicles and target passengers from visual information from the camera system.

Figure 8A:
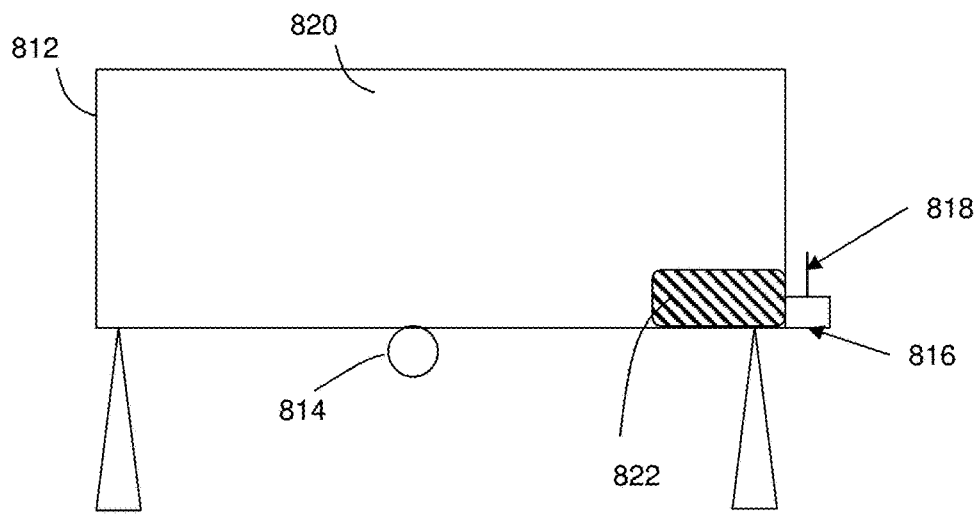
FIGS. 8A and 8B depict illustrative embodiments of exemplary targeted billboard systems.
Figure 8B:
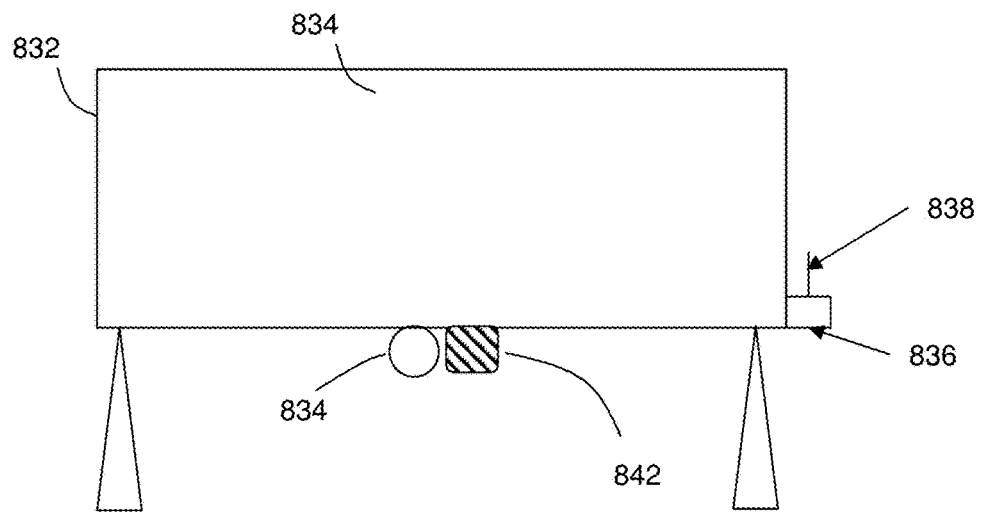

FIGS. 8A and 8B illustrate exemplary embodiments of a targeted billboard system 810 that may be provided in system 100. FIG. 8A illustrates a targeted billboard 812. Exemplarily, targeted billboard 812 can include a display device such as display 122 of FIG. 1. Exemplarily, targeted billboard 812 includes a main advertising area 820 and a targeted code area 822. Exemplarily, targeted code area 822 can provide codes to vehicle equipment independent of the main advertising area. Exemplarily, the targeted code area 822 is a discrete portion of the main advertising area that can change as desired which can be viewed by equipment of on-coming traffic, able to process the code. In addition, targeted billboard 812 can exemplarily include a camera system 814 similar to the camera system 102 of FIG. 1. In addition, targeted billboard 812 can include a processing center 816 that can support, for example, any of the functions of FIG. 1, including a profile store 110 and communications with a media server 120. In addition, targeted billboard 812 can include communication apparatus 818 that can communicate with remote servers, such as through a cellular tower 215 of FIG. 2 discussed below.

FIG. 8B illustrates another exemplary embodiment of a targeted billboard system 830 in which a conventional billboard 832 having a message 834 has been modified with equipment such as camera unit 834 and processing unit 836 that can communicate with a processing center 836 and communications system 838 similar to the systems described above for system 810 of FIG. 8A. Exemplarily, conventional billboard can be a conventional tri-panel billboard or a single panel billboard that has been modified to provide targeted marketing. By exemplarily applying the components of system 830 to billboard 832, the billboard can be retrofitted to perform directed marketing functions described below. Exemplarily, the 842 coded transmission area can discretely provide codes to equipment of vehicles able to view the code or codes being broadcast.

Returning to FIG. 1, other embodiments of system 100 can include a spatial processor configured to receive mobility information related to a number of vehicles, including vehicles within a region or area including the digital billboard 122. The mobility information can include, e.g., a location, position, bearing, motion or some other spatial reference related to the location or position for each vehicle.

An exposure region can be defined, e.g., as a region defined within an area located in front of the digital billboard 122 for which a vehicle and its occupants can view the targeted billboard and the digital billboard 122. The area can extend from a surface of the digital billboard 122, or from a minimum exposure distance in front of the digital billboard 122, e.g., one half, one quarter or some other fraction of a width of the digital billboard, out to a maximum viewing distance. The maximum viewing distance can be determined as a distance beyond which the media content portrayed at the digital billboard can be understood. The maximum viewing distance can also be determined, e.g., as a number of widths, e.g., 10, 20, 50 or some other number times the width of the digital billboard 122. The shape of the area can be any suitable shape, such as a polygon, e.g., a rectangle, a trapezoid, a semi-circle, semi-ellipse or some combination, e.g., as might be affected from blockages, e.g., walls, buildings. The shape of the viewing area is generally defined by the area within which the media content can be understood and beyond which the media content cannot be understood or otherwise resolved. The minimum and/or maximum ranges can be determined according to the nature of the media content itself, e.g., whether it contains text, whether it contains still and/or moving images and so forth.

Thus, at any given instant, audience membership can be determined according to vehicles then within the exposure region. Updates to the audience membership can be accomplished on an event basis, e.g., upon a vehicle entering or leaving the exposure region, on a time bases, e.g., according to a refresh rate or update schedule, e.g., every 1 second, 5 seconds, 30 seconds, 1 minute, and so forth.

The system 100 includes an individuals' profile store 110 providing access to ancillary information related to one or more members of the audience. The individuals' profile store 110 is in communication with the audience detector 106, receiving inputs from the audience detector 106, e.g., to identify members of an audience of users of the vehicles. The individuals' profile store 110 can access one or more individual profiles, or individual profiles 112 related to the members of the audience. In the illustrative example, the audience includes 'n' members associated with n vehicles of the 'm' vehicles reported by the spatial processor 102. Generally, the number of audience members 'n' is less than or equal to the number of vehicles 'm,' i.e., n≤m.

The individual profiles 112 can include information in the form of individual profiles. The individual profiles can include one or more pieces of information entered by corresponding users of the vehicles, including those vehicles reported by the camera system 102. Information of the individual profiles 112 can include demographic information, such as gender, age, address, income, spending habits, affiliations, e.g., school(s), employer(s), professional organizations, clubs and so forth. Alternatively or in addition, the information of the individual profiles 112 can include psychographic information, e.g., related to attitudes, needs, values and mental postures. Such psychographic information can be obtained from a psychographic analysis, e.g., obtained voluntarily by a test administered to the user of the mobile device and/or indirectly by monitored activity, e.g., from historical records of online activity.

Exemplarily, not every vehicle is known to the individual profiles store 110. Instead, the individual profiles store 110 may create a hypothetical profile based on observable information regarding a vehicle. Thus, even if a vehicle and its drives and/or passengers is not known, the profile store 110 can create a hypothetical profile for that vehicle and its drives and/or passengers. In one embodiment, the profile can be created by transferring demographic information that is generalized for a make and model of a car and the average aggregated demographic or psychographic information for a typical driver (and passengers). For example, without knowing specifics about the driver and passenger, aggregated statistics may determine the most common occupant age of a luxury car is in the 35-50 year old range.

A profile system 114 is in communication with the individuals' profile store 110, receiving the individual profiles and hypothetical profiles 112 retrieved by the individuals' profile store 110. The profile system 114 determines a profile 116 of the audience of vehicles determined by the audience detector 106. A profile determined by the profile system 114 can be a representative profile of one or more audience members. For example, one or more characteristics or features of individual profiles 112, such as age and/or gender, can be used to sort the individual profiles 112 into groups of profiles, e.g., compliant with the one or more features. The resulting groups of profiles can be arranged or otherwise sorted, e.g., according to compliance with the one or more features. Thus, individualized directed advertising or marketing material can be provided to each target vehicle or driver/passenger for the targeted vehicle according to a determined or otherwise estimated profile for that vehicle or driver/passenger.

In another embodiment, profile data from exterior information sources may be paired with demographic and car information databases. For example, if one digital billboard 122 is near an onramp to major roadways the camera system 102 first detects a new vehicle, it may initialize a user's profile 110 to a demographic and psychographic profile that is typical for home owners and renters in that geographic area. Even if these profiles are highly erroneous, they may help to improve the accuracy of the profile system 114.

A media selector 118 is in communication with the profile system 114, receiving profiles from the profile aggregator 114. In at least some embodiments, the media selector 118 receives, from the exposure estimator 108 (shown in phantom), an estimate of an exposure of the audience members to the digital display. Alternatively or in addition, the media selector 118 receives one or more other information items 124, e.g., from ancillary information sources. Examples of such ancillary information can include, without limitation, time of day, day of the week, season, and a prior history of one or more users of the audience of users.

The media selector 118 selects or otherwise recommends directed advertising or marketing material for presentation at the media presentation device, e.g., the digital billboard 122. Such recommendations can be based on one or more of the profiles 112, the exposure estimator 108 and/or the other information items 124. The media selector 118 can determine from the input from the exposure estimator 108 how long the audience member(s) are exposed to the directed advertising or marketing material displayed at the digital billboard 122. The determination can be based, e.g., upon trajectory information of the vehicles provided by the spatial processor, to estimate when the audience member(s) are/will be within the exposure region and/or how long the audience member(s) will remain within the exposure region.

By way of illustrative example, exposure estimates for a roadside digital billboard would be substantially different depending on one or more of the time, day and location. An exposure estimate determined during weekday rush hour, i.e., relatively long exposure, versus other times, such as nights and weekends, i.e., relatively short exposure, and would be substantially different. The former can be measured, e.g., in minutes; whereas, the latter can be measured in seconds.

It is also understood that the information obtained or otherwise determined by the system, e.g., by the media selector 118, can be used to determine revenue and/or value of the directed advertising or marketing material. The value can be responsive, e.g., to a number of passengers in a vehicles, a subset of passengers according to one or more particular characteristics, a duration of exposure, a location and/or any other information items 124, such as the examples disclosed above. Thus, a message/advertisement segment displayed to a relatively large number of audience members, e.g., resulting from heavy traffic within a vicinity of the digital billboard 122 can have a greater value than the same message/advertisement segment displayed to a relatively small number of audience members, e.g., during periods of light traffic. Reference to traffic can include one or more of numbers of audience members and/or a density of audience members within the exposure area, and/or exposure times.

The system also includes a media server 120 in communication between the media selector 118 and the digital billboard 122. The media server 120 can perform one or more functions related to display of the information message/advertisement at the digital billboard 122. By way of illustrative example and without limitation, functions related to display include buffering at least a portion of a directed advertising or marketing material, scheduling of presentation of the directed advertising or marketing material, formatting of the directed advertising or marketing material, e.g., according to the particular digital billboard 122. One or more of the system components 102, 106, 108, 110, 114, 118, 120 can be provided as a standalone device or combined with one or more of the other devices.

It is also understood that one or more of the system components can service one or more devices of the system 100, e.g., redundant or duplicate, downstream devices to allow for economies of scale. For example, the spatial processor can be centrally located at a mobile service provider facility, a media service provider facility, or some third party facility, servicing multiple independent groups of vehicles, e.g., at different locations with respect to different digital billboards 122. For example, a single digital billboard provided along a roadway can include two or more displays facing in two or more independent directions, e.g., opposite directions. Thus, the same infrastructure, in terms of system components 102, 106, 108, 110, 114, 118, 120 can be used to independently drive two digital billboards 122. During rush hour traffic, a first high value advertisement can be displayed in one direction, e.g., facing oncoming rush hour traffic, while a low value advertisement can be displayed in the other direction, e.g., facing the direction opposite to the rush hour traffic. The same message can be displayed simultaneously to each side of the billboard, differing by value, e.g., revenue derived from exposure of the digital content item.

Figure 2:
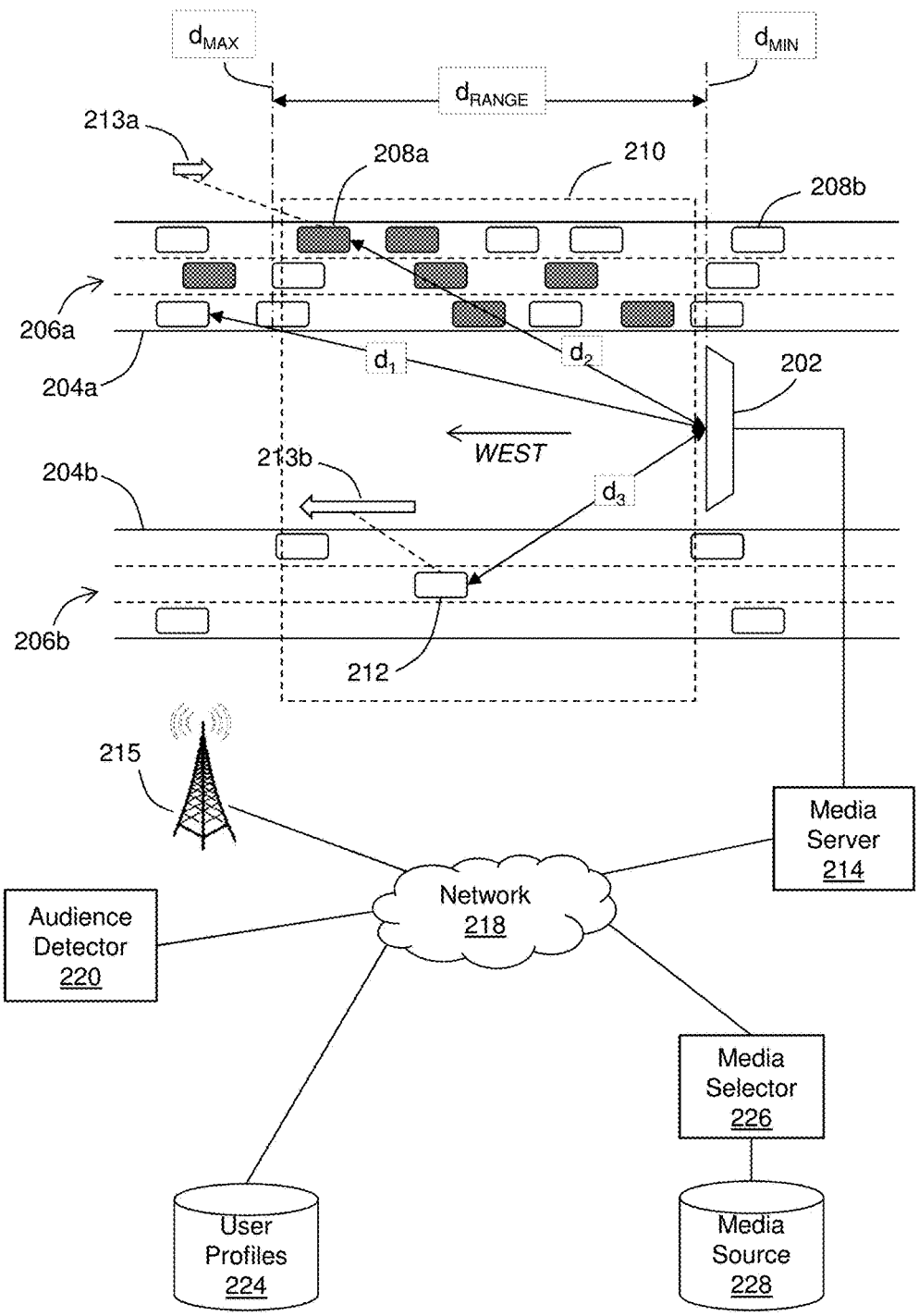
FIG. 2 depicts an illustrative embodiment of system 200.

FIG. 2 depicts an illustrative embodiment of a system 200 that selects directed advertising or marketing material for presentation at a targeted billboard positioned with respect to a roadway. A targeted billboard 202 is positioned along a median strip of an East-West segment of roadway or highway having a number of eastbound lanes 204a and a number of westbound lanes 204b. As illustrated in FIG. 1, the targeted billboard 202 can include a digital display 122 as well as a traditional billboard equipped with an additional digital display 122. The targeted billboard 202 includes a display screen that is facing west, to provide messages and/or advertisements to eastbound traffic 206a along the eastbound roadway segment 204a. In the illustrative example, seventeen cars 208a, 208b are on the eastbound segment of roadway 204a. A distance, e.g., $d_1$, $d_2$, can be drawn from a display surface of the digital billboard to each respective car 208a, 208b (generally 208) on the roadway segment 204a. The illustrative example also identifies a minimum viewing distance $d_{min}$ and a maximum viewing distance $d_{max}$, with a range, $d_{range}$ defined between the $d_{max}$ and $d_{min}$.

An exposure region can be determined extending along the eastbound lanes 204a between $d_{max}$ and $d_{min}$, e.g., a rectangular exposure region 210. In the illustrative example, only eleven of the seventeen cars 208 are substantially within the exposure region 210. Vehicles on the eastbound lanes 204a that fall outside of the exposure region 210 are not considered to be within the audience of users. Likewise, vehicles on the westbound lanes 204b fall inside of the exposure region 210 of the digital display 202, but are not considered as their westbound trajectories indicate they are driving away from the display 202.

Also illustrated in FIG. 2 is a mobile service provider tower 215, e.g., a mobile cellular radio communications tower 215. The cell tower 215 can be in wireless communication with mobile communication devices in one or more of the cars 208, 212 in the roadway segments 204a, 204b proximate to the digital billboard 202. Although one cell tower 215 is illustrated, it is understood that more than one cell tower 215 can be in communication with one or more of the cars 208, 212, e.g., according to different mobile service providers, geographical differences, levels of service.

Exemplarily, the camera system 102 and audience detector 106 of FIG. 1 can be utilized to determine trajectories for the cars 208. The term trajectory, as used herein, can include one or more of position, e.g., geo-coordinates, direction, e.g., compass bearing, and motion. Motion can include one or more of speed, velocity, acceleration, and deceleration. In some embodiments, motion aspects of the trajectory can be determined according to two or more position updates. Thus, at a first time $t_1$, a first position at time $t_1$ of $p(t_1)$ is determined according to a first set of geo-coordinates $x_1, y_1$. At a later time $t_2$, a second position $p(t_2)$ is determined according to a second set of geo-coordinates $x_2, y_2$. A velocity can be determined according to a positional vector from $p(t_1)$ to $p(t_2)$ over the time difference $t_2-t_1$. Namely, a velocity $V(t_2)=[p(t_1)-p(t_2)]/(t_2-t_1)$. Standard vector analysis produces a magnitude of $V(t_2)$ and a direction or angle of $V(t_2)$. Similar techniques can be used to determine acceleration, deceleration, averages, and the like.

In the illustrative system 200, an audience detector 220 receives spatial information, including one or more trajectories, e.g., a first trajectory 213a, of the eastbound vehicles 206a and a second trajectory 213b of the westbound vehicles 206b. The trajectories are illustrated as vectors with arrows indicating direction and sizes corresponding to magnitude. Thus the first trajectory 213a being much shorter than the second trajectory 213b indicates that eastbound traffic is traveling much slower than westbound traffic. Such a scenario might be experienced during each morning rush hour commute, with the pattern being reversed between eastbound and westbound for the evening rush hour commute.

The audience detector 220 may receive trajectories for cars 208 within a proximity of the digital billboard 202 and/or at distances remote from the digital billboard. The audience detector 220 can be configured to process the trajectories 213a, 213b. Although a single network cloud 218 is illustrated, it is understood that network connectivity between and among any of the devices of the system 200 can be accomplished by one or more networks, such as proprietary networks, e.g., of mobile service providers, public networks, e.g., the Internet, and the like. The audience detector 220 determines which of the cars 208 within the exposure region 210 and traveling eastbound, can be exposed to any messages and/or advertisements presented at the digital billboard 202.

The user profiles server 224 can receive information from the audience detector 220 to determine directed advertising or marketing material for target vehicles and target passengers. Thus, in some embodiments, one or more cars 208 are detected and determined to be candidates for receiving directed advertising or marketing material. In some instances, the vehicles may be known because they have "opted-in" to an advertising system in which the vehicle is easily identifiable to the camera system 102 of FIG. 1. In addition, vehicles that have opted-in may have equipment on board to easily receive messages from the digital billboard 202 to promulgate the directed advertising or marketing material to the drivers and/or passengers.

Exemplarily, not every vehicle is known to the individual profiles store 110. Instead, the individual profiles store 110 may create a hypothetical profile based on observable information regarding a vehicle. Thus, even if a vehicle and its drives and/or passengers is not known, the profile store 110 can create a hypothetical profile for that vehicle and its drives and/or passengers. That is, exemplary psychographic and demographic information can be estimated based on the type of vehicle, a color of the vehicle, a driving style of the vehicle observed from watching the vehicle behave, and an age of the vehicle. In some embodiments, an identification of the driver and/or the occupants can inform the estimation of the exemplary psychographic and demographic information for the vehicle.

A media selector 226 receives user profile from the user profile server 224 by way of the network 218. The media selector selects one or more media content items and directed advertising or marketing material for display by the digital billboard according to the user profiles. A media server 214 receives either the media content items themselves, or an indication of the media content items, e.g., a pointer, a uniform resource locator, or other suitable identifier. The media server 214 performs any reformatting and/or scheduling required and forwards the media contents items and directed advertising or marketing material to the digital billboard 202 for display thereon. The processing disclosed in relation to FIG. 2 can be accomplished in real time or near-real time, such that audience members and media content can be identified and displayed while vehicle and its drives and/or passengers pass within the exposure region 210 of the digital billboard 202.

Figure 9A:
FIGS. 9A, 9B, and 9C depict illustrative embodiments of another exemplary targeted billboard system.
Figure 9B:
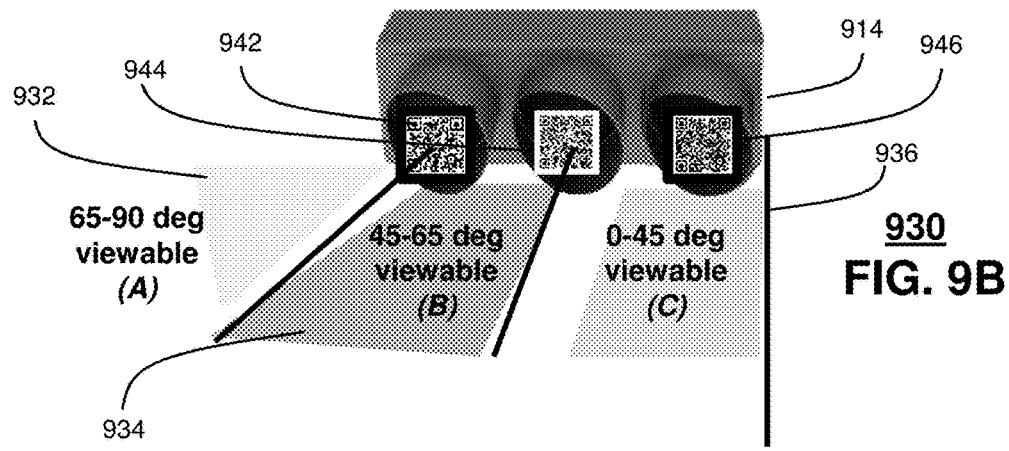
Figure 9C:
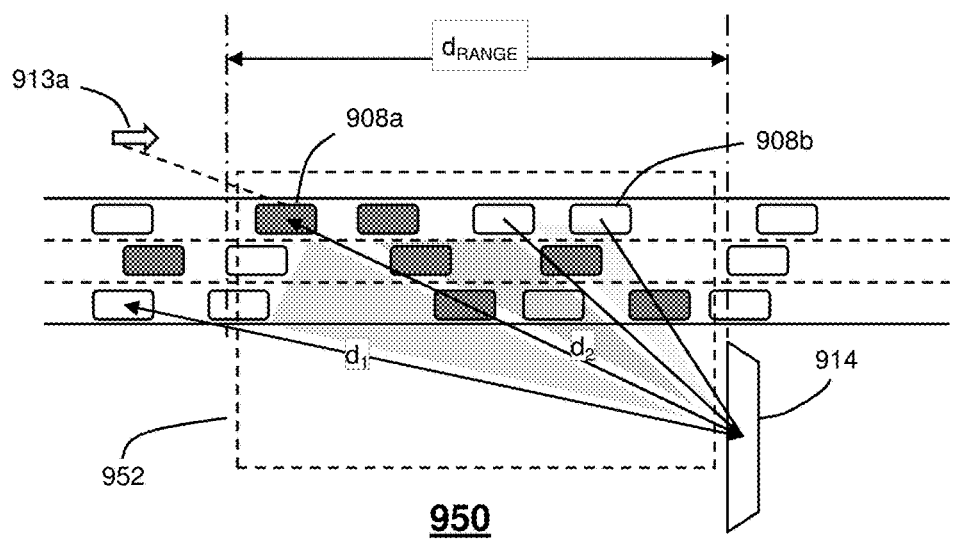

FIGS. 9A, 9B, and 9C illustrate another exemplary embodiment of a targeted billboard system 910. Exemplarily, targeted billboard system 910 can target different user equipment. Referring to FIG. 9A, a targeted billboard 912 with a targeted code area 914 similar to the targeted code area 822 of FIG. 8A which has multiple signaling elements Referring to FIG. 9B, target code area can include signaling elements 942, 944, and 946. In other embodiments, any number of signaling elements can be applied to the targeted billboard 912. Similar to embodiments discussed above, signaling elements 942, 944, and 946 can communicate with embodiments of media server 214, network, 218, and cell tower 215 of FIG. 2 to provide directed advertising or marketing material.

Referring to FIGS. 9B and 9C, exemplarily embodiments of targeted code area 914 can target different lanes of oncoming traffic to provide unique directed advertising or marketing material for different audiences. Thus, signaling element 942 can exemplary be directed at a 65-90 degree viewable area, signaling element 944 can be directed at a 45-60 degree viewable area, and signaling element 946 can be directed at a 0-45 degree viewable area. Other embodiments can have various signaling elements directed at various angles. In yet other embodiments, the targeted code area 914 can have adjustable blinders to adjust these angles as directed.

Exemplarily, as traffic flow 913a approaches the targeted billboard 912, different signaling elements can present different directed advertising or marketing material at, depending on the embodiments, the driver and/or the occupants of the vehicle through the equipment of the different vehicles. Targeted code area 914, through signaling element 946, can thus reach vehicle 904a as it approaches the viewing area 952. Similarly, vehicle 908a can be reached by targeted code area 914, through signaling element 944. In some embodiments, cars in the same lane can be reached by different portions of the targeted code area 914 as vehicle 908b, which is in the same lane as vehicle 908a, can be reached by targeted code area 914, through signaling element 942, as vehicle 908b nears the targeted billboard 912.

Figure 10:
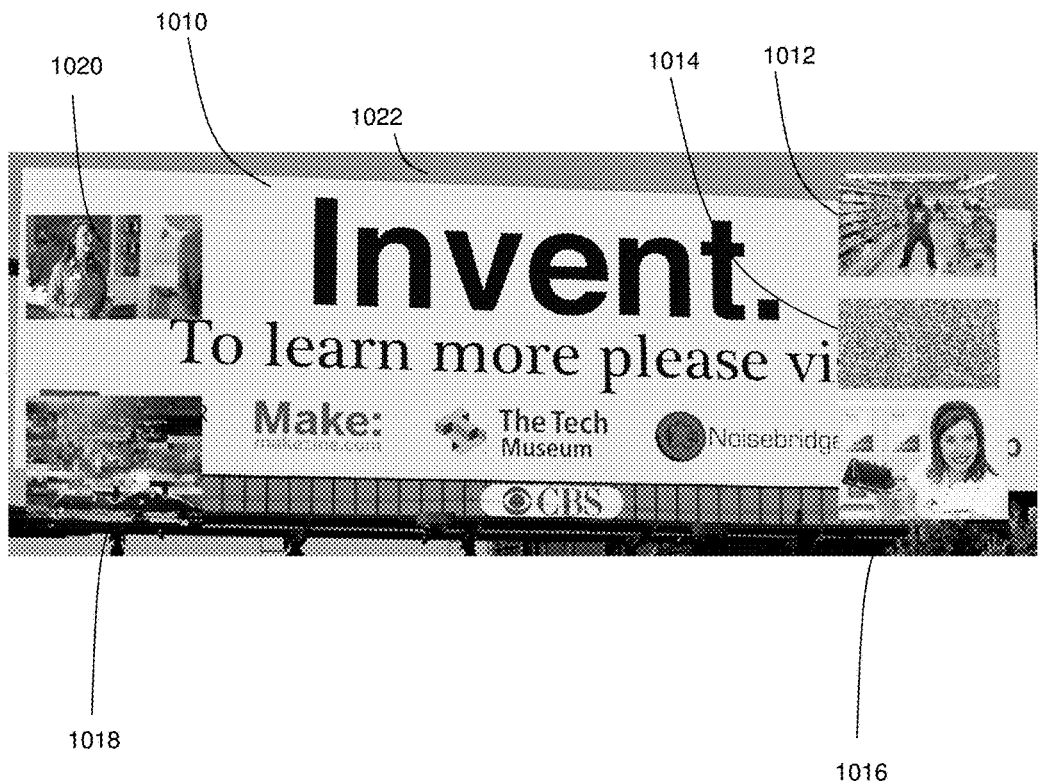
FIG. 10 depicts an illustrative embodiments of another exemplary targeted billboard system.

FIG. 10 illustrates another exemplary embodiment of a targeted billboard 1010. Exemplarily, targeted billboard 1010 can provide content without requiring a network connection on the part of equipment of the vehicle. Targeted billboard 1010 includes, similar to the embodiments of targeted billboard 812 with main advertising area 820 and targeted code area 822 of FIG. 8A, another billboard display 1022 which can be manipulated to display various messages on the screen area of the billboard display 1022. Exemplarily, each targeted code area 1012, 1014, 1016, 1018, and 1020 can provide a unique directed advertising or marketing materials for different audiences. Exemplarily, each targeted code area 1012, 1014, 1016, 1018, and 1020 could be titled or directed towards different areas of the traffic flow as exemplarily illustrated in FIGS. 9A-9C, for example.

In some embodiments, targeted code area 1014 can be a simple code that can be read by equipment of a vehicle. In another embodiment, the targeted code areas can include content that can be observed by the equipment of the vehicle and be replayed to the occupants of the vehicle as exemplarily directed, whether to the driver or passenger. Thus, each targeted code area 1012, 1016, 1018, and 1020 contains some observable media content that can be replayed in the vehicle, from still images to moving images. In some embodiments, these images 1018 can be encrypted so that only equipment of a particular vehicle can observe the images. Exemplarily, a distortion observed based on motion and angle between the images and the vehicle can be corrected to provide a clear image.

Figure 3:
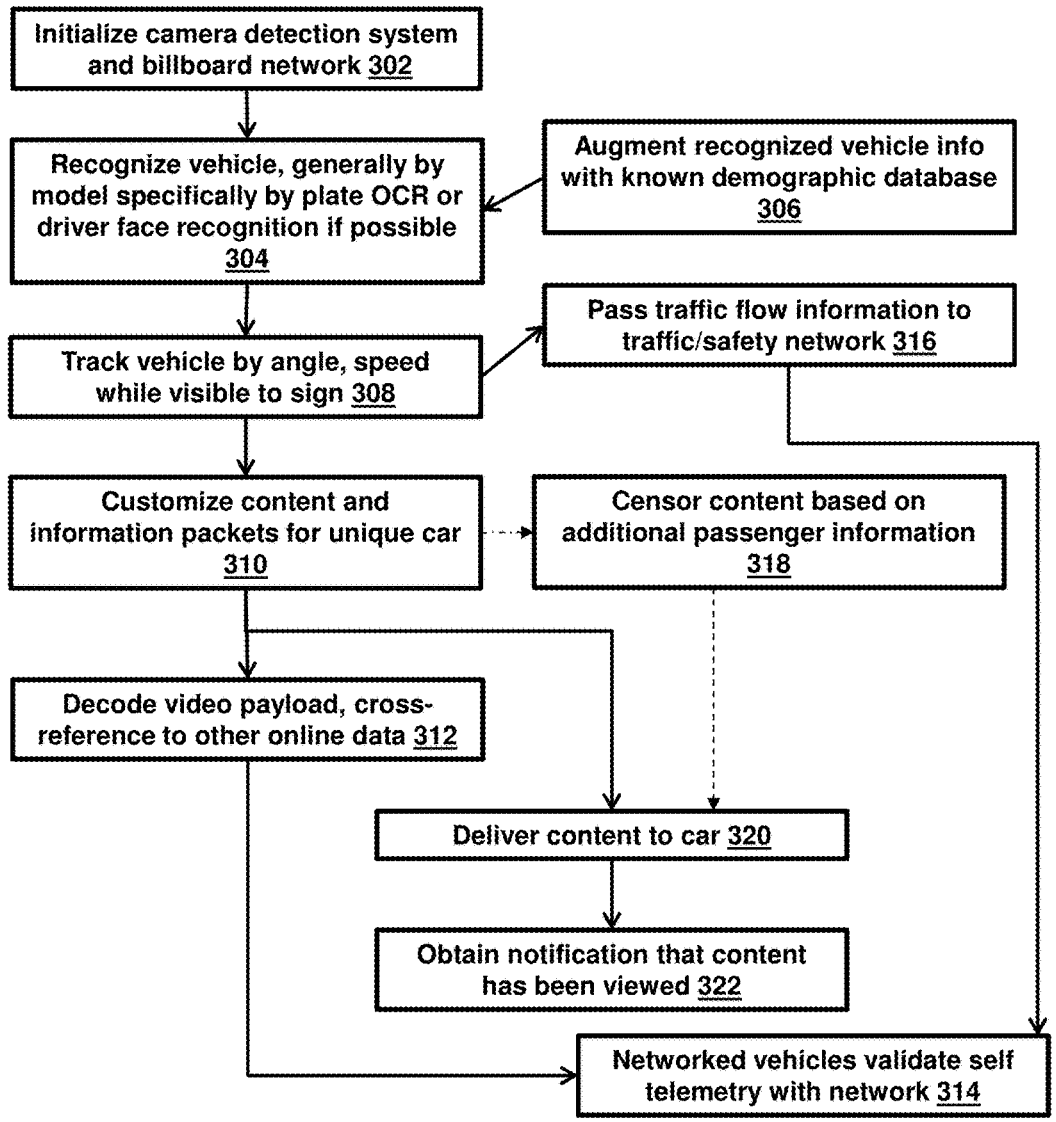
FIG. 3 depicts an illustrative embodiment of a method used in portions of the system described in FIGS. 1 and 2.

FIG. 3 illustrates an exemplary method 300 that can be used in systems 100 and 200 of FIGS. 1 and 2, as well as in the exemplary targeted billboards of FIGS. 8-10. In Step 302, a camera detection system and a billboard network can be initialized with the appropriate ad content and demographic targeting information. Exemplarily, targeted billboards will be provided with cameras or other detection systems that will enable tracking and identification of vehicles. In Step 304, a camera system on the targeted billboard can recognize individual vehicles. Exemplarily, the vehicle can be recognized first by the type of vehicle. Next, the owner of the vehicle can be recognized. Exemplarily, the recognition of the owner can be performed by reading the license plate of the vehicle. In additional embodiments, the recognized vehicle information can be augmented with a known demographic database.

In other embodiments, the driver or passengers of the vehicle can be recognized. For example, an optical character recognition software package can be employed to read the license plate. In other examples, facial recognition software can be employed. In yet other embodiments, a decal or other signifier can be detected on the vehicle itself. In some embodiments, a driver may opt-in to an exemplary advertising system by placing an identifier on the vehicle, such as an innocuous sticker on the windshield, which would enable easy identification of the vehicle, as well as account information and delivery information.

Exemplarily, vehicles in a traffic stream visible to the targeted billboard can be recognized or otherwise visually interrogated as candidates for marketing or advertising information. Some vehicles may not be candidates for targeted ads, others may lack the necessary equipment, while some vehicles can be recognized as apt targets for direct marketing. In some embodiments, a vehicle can self-identify as discussed above. In other embodiments, the vehicles can be known. In other embodiments, demographic or other marketing information about the vehicles can be estimated or guessed by the system.

Once a vehicle has been recognized, in Step 308, the vehicle can exemplarily be tracked. The tracking of the vehicle can include monitoring the speed of the vehicle as well as the angle of the vehicle with respect to the targeted billboard. Exemplarily, this tracking information can be used to determine a time that the targeted billboard can be in sight of the vehicle. In additional embodiments, the vehicle's tracking data can be provided to a traffic and safety monitoring system in Step 316.

For example, the tracking information of each vehicle in a stream of traffic can be summarized to provide a description of the current traffic condition. In some embodiments, referring to FIGS. 9A, 9B, and 9C, the tracking information can be used to inform the signal information sent to signaling elements 942, 944, and 946. In yet other embodiments, the tracking information can be used to direct adjustable blinders of an embodiment of an adjustable targeted code area 914. Exemplarily, this step can be performed while respecting an anonymity and privacy of the vehicles in traffic. Referring back to FIG. 3, in further embodiments, networked vehicles can validate their self-telemetry with a network through the targeted billboard system in Step 314.

Once a vehicle is recognized and determined to be a candidate for marketing or advertising materials, referred to as a target vehicle, in Step 310 an appropriate advertising or marketing material, referred to as a packet, can be prepared or retrieved. In additional embodiments, in Step 318, the content can be censored if vehicle occupant information shows that the packet would be inappropriate for some occupants of the vehicle. For example, some packets may not be appropriate for children or teenage passengers. Next, in Step 320, the targeted billboard can exemplarily deliver the packet to a target vehicle. Exemplarily, multiple vehicles can be targeted in a short period of time and their respective packets can be delivered in rapid succession to ensure each target vehicle receives its packet in a timely fashion while the target vehicle is within viewing distance of the targeted billboard.

Exemplarily, the targeted billboard can deliver the packet by projecting an image that can be recognized by equipment of the target vehicle. For example, a target vehicle may be equipped with a camera-enabled navigation system. In other examples, the target vehicle may have a dash mounted, road-viewing camera. Exemplarily, the dash mounted, road-viewing camera can communicate with other vehicle equipment, such as an on-board computer, an on-board entertainment system, or a stereo system. In other examples, the various cameras can communicate with communication devices of the passengers. For example, a dash mounted, road-viewing camera can be enabled to communication with nearby equipment, such as through Bluetooth® or near-field communication capabilities. In other exemplary embodiments, equipment capable of detecting the image can communicate with other equipment through a wireless internet connection.

Exemplarily, the targeted billboard can flash a QR code for each target vehicle as the image. Exemplarily, the individualized QR code can be displayed discretely while the main message of the billboard remains prominent. In other embodiments, the image can instead be a bar code or other visual communication medium. In Step 312, each target vehicle can then use the image to access the information for the vehicle to present directed advertising or marketing material to the driver or passengers of the target vehicle. Exemplarily, the targeted billboard can provide the image while still maintaining its larger advertising message. In some examples, the targeted billboard can be a whole digital display where the images are provided in a side portion. In other embodiments, a conventional billboard can be provided with the camera system 102 and display 122 of FIG. 1 to provide additional advertising opportunities in addition to the main message of the billboard.

Exemplarily, the directed advertising or marketing material can be presented through the vehicles various on-board systems. In one example, the radio can simply be instructed to present the directed advertising or marketing material. In other embodiments, audio and/or video content can be displayed through an on-board display, such as a navigation system or an on-board entertainment system. In other embodiments, communications or computing devices of the driver or passengers can be provided with the directed advertising or marketing material.

In one example, a vehicle is spotted by the camera system. In this example, the vehicle is unknown but the vehicle type is determined to be of marketing value for the targeted billboard. In addition, the system may consider whether the vehicle in question is likely to be able to receive coded images in accordance with the system. In addition, the driver and/or passengers can be viewed for further determination of a marketing value of directing advertisements to them. Exemplary embodiments of the system would then generate an appropriate directed advertising or marketing material package with a related coded image to provide to the vehicle. While the vehicle is in view the directed coded image is related to the vehicle and observed and processed by an onboard imaging system of the vehicle. Exemplarily, the vehicle's on-board entertainment system would provide an opportune instance to deliver the directed advertising or marketing material to the driver and/or passengers. In some embodiments, no further action would be taken while in other embodiments, the driver and/or passengers could take additional steps to receive further information, such as accessing a website, such as through an on-board computing system or through personal communications devices or computers.

In another example, the vehicle is owned or operated by a driver that has opted-in to the exemplary advertising system. In some examples, the drive can cam make his vehicle visible through a sticker attached to the windshield or another location. In other examples, the vehicle is visually known to the system. In yet other examples, the system knows the vehicle because the license plate of the vehicle has been entered into the system. In similar examples, the vehicle has become known because the vehicle has, in the past, successfully participated in the activation of the directed image provided by the targeted billboard.

In Step 322, information can be provided to the system 100 that the directed advertising or marketing material provided to a target vehicle has been consumed. In other embodiments, a non-target vehicle can nonetheless observe a targeted image and respond thereto to thus become a known vehicle to be targeted in the future. That is, successful reception of the targeted images by targeted and untargeted vehicles can be processed and added to an overall understanding of the marketing variables for the user profile server 224 of FIG. 2 and the profile system 114 of FIG. 1.

Figure 7:
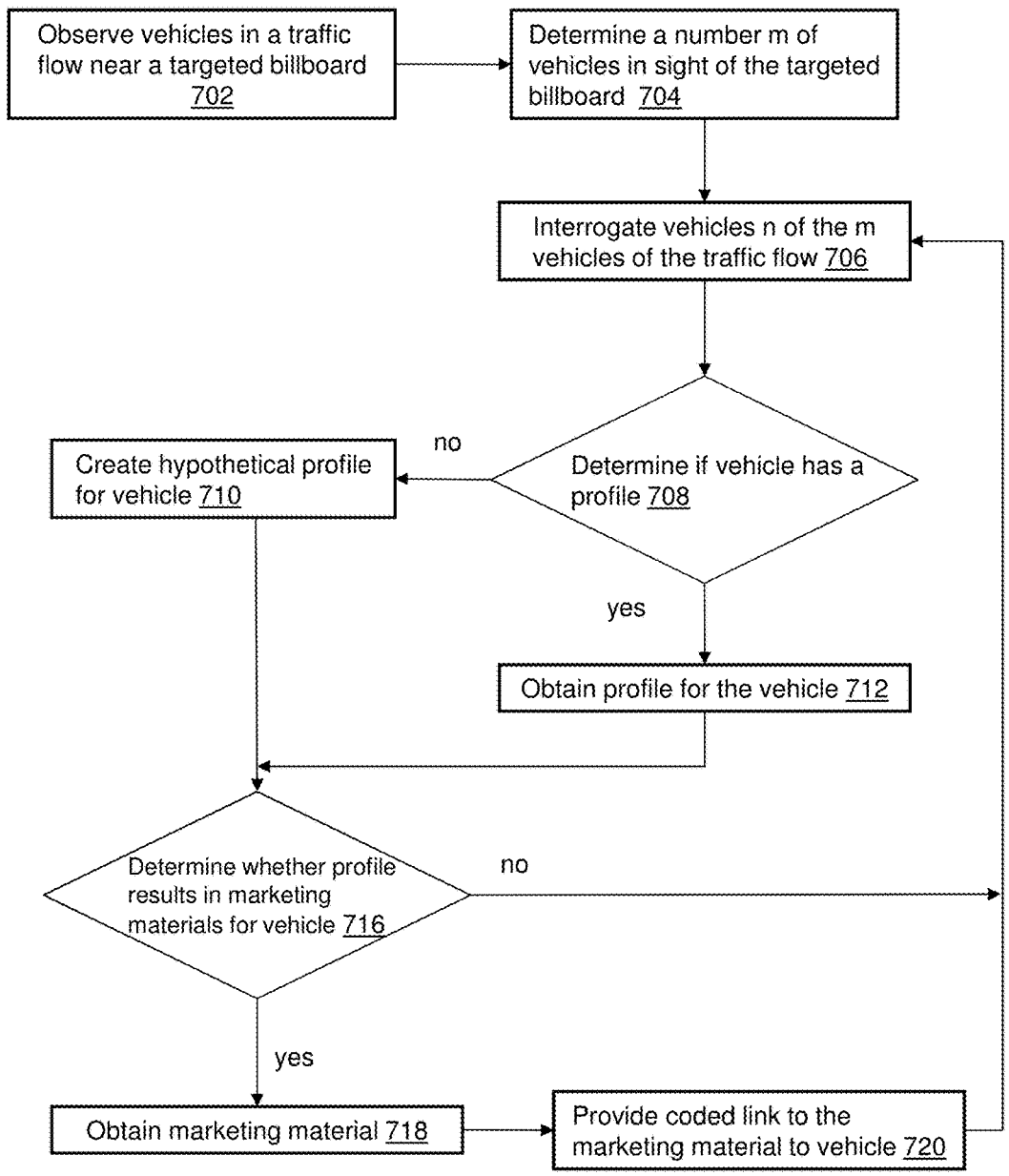
FIG. 7 depicts another illustrative embodiment of a method used in portions of the system described in FIGS. 1 and 2.

FIG. 7 illustrates an exemplary method 700 that can be used in systems 100 and 200 of FIGS. 1 and 2 and method 300 of FIG. 3. In Step 702, an exemplary targeted billboard has been placed near a roadside to observe a traffic flow. In observing the traffic flow, an audience for the billboard is determined, including m vehicles being observed, in Step 704. As described above with respect to FIG. 2, it is likely that only n number of the m vehicles will be eligible for a targeted advertisement. Exemplarily, in Step 706, an iterative process will begin for each of the m vehicles to determine which vehicle should be provided with individualized directed advertising or marketing materials.

In Step 708, a vehicle can exemplarily be interrogated by the system to determine if a profile exists for that vehicle. In some examples, a profile 112 in profile store 110 already exists. In some embodiments, the vehicle carries an identification, such as a sticker that would easily identify the vehicle as a participant in a directed marketing system, such as a windshield sticker. In other embodiments, the vehicle can be identified through a license plate or other distinguishing markings. If the vehicle is recognized as having a profile, the profile is exemplarily retrieved in Step 712.

If, on the other hand, there is no profile for the vehicle, a hypothetical profile for that vehicle can be created in Step 710. The hypothetical profile can be exemplarily be created based on observable features of the vehicle, including a make, model, and color of the vehicle, as well as on identifiable features of the driver and/or occupants of the vehicle. Some vehicles may present more information than others to create this hypothetical profile, thus leading to many instances in which the observed vehicle has no real value to the system.

Once a profile has been retrieved or a hypothetical profile has been formed, that profile can exemplarily be compared to various marketing directives associated with the targeted billboard in Step 716. In some examples, these directives will be related to the main message of the targeted billboard. In other embodiments, marketing materials can be obtained that are unrelated to the original main message of the targeted billboard. In some instances, no worthwhile or ready directed marketing message can be found based on the profile. Exemplarily, method 700 would proceed back to Step 706 to interrogate a next vehicle of the m vehicles. On the other hand, in Step 718, marketing materials that have been found to be relevant for the profile can be obtained. In some examples, these materials can be obtained via media selector 226 and media source 228 of FIG. 2.

Next, in Step 720, a coded link can exemplarily be relayed to the vehicle in question. Referring to FIG. 2, each car 208 in the "eastbound" direction will be provided with a personalized coded link. Exemplarily, each car 208 in the "eastbound" direction can observe the signal but equipment of each vehicle can differentiate between these signals to deliver the proper message. For example, a known vehicle may recognize a coded link that is intended for that vehicle while equipment of other vehicles may recognize that a directed link not intended for that vehicle should be ignored. Some vehicles may collect all the signals and provide an interface to decide which codes to accept and which to ignore. For example, any code showing it's directed towards known vehicle profiles may simply be ignored by the equipment of a vehicle that was not targeted. Each vehicle may then dispose with an observed code as desired.

Next, referring to FIG. 3, in Step 322, equipment of the vehicle or other user devices can provide notification to, network 218 via a cell tower 215 of FIG. 2 as one example, a notice that the directed individualized directed advertising or marketing materials has been accessed. In some examples, an unknown vehicle that responds to a code, even one not intended for it, can exemplarily have a profile created for it in the profile store 110. Some hypothetical profiles can therefore be transitioned into full profiles 112. These profile's individual marketing analyses can then be updated based on their responses that are received.

As described above, the exemplary code would be provided discretely in addition to a main targeted billboard message. In some embodiments, the targeted billboard could be configured to provide multiple panels to provide a variety of main messages. System 200 could provide directed individualized directed advertising or marketing materials related to each of these messages. In one example, an existing conventional tri-panel billboard could be provided with an embodiment of the current system in which a camera system and an additional display are added to provide a user with a modified billboard system capable of displaying three different panels with related directed advertising or marketing material for each panel's main message. In some embodiments, the display 122 of FIG. 1 could be large enough to provide a main message in addition to a coded message area segment.

Once the coded message has been broadcast, method 700 would proceed back to Step 706 to interrogate a next vehicle of the m vehicles. Exemplarily, this process would repeat for each car 208 of the exposure region 210 of FIG. 2 as cars enter and leave the exposure region 210.

While for purposes of simplicity of explanation, the respective processes are shown and described as a series of blocks in FIGS. 3, 7, 8A-8C, and 9A-9C, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methods described herein.

Figure 4:
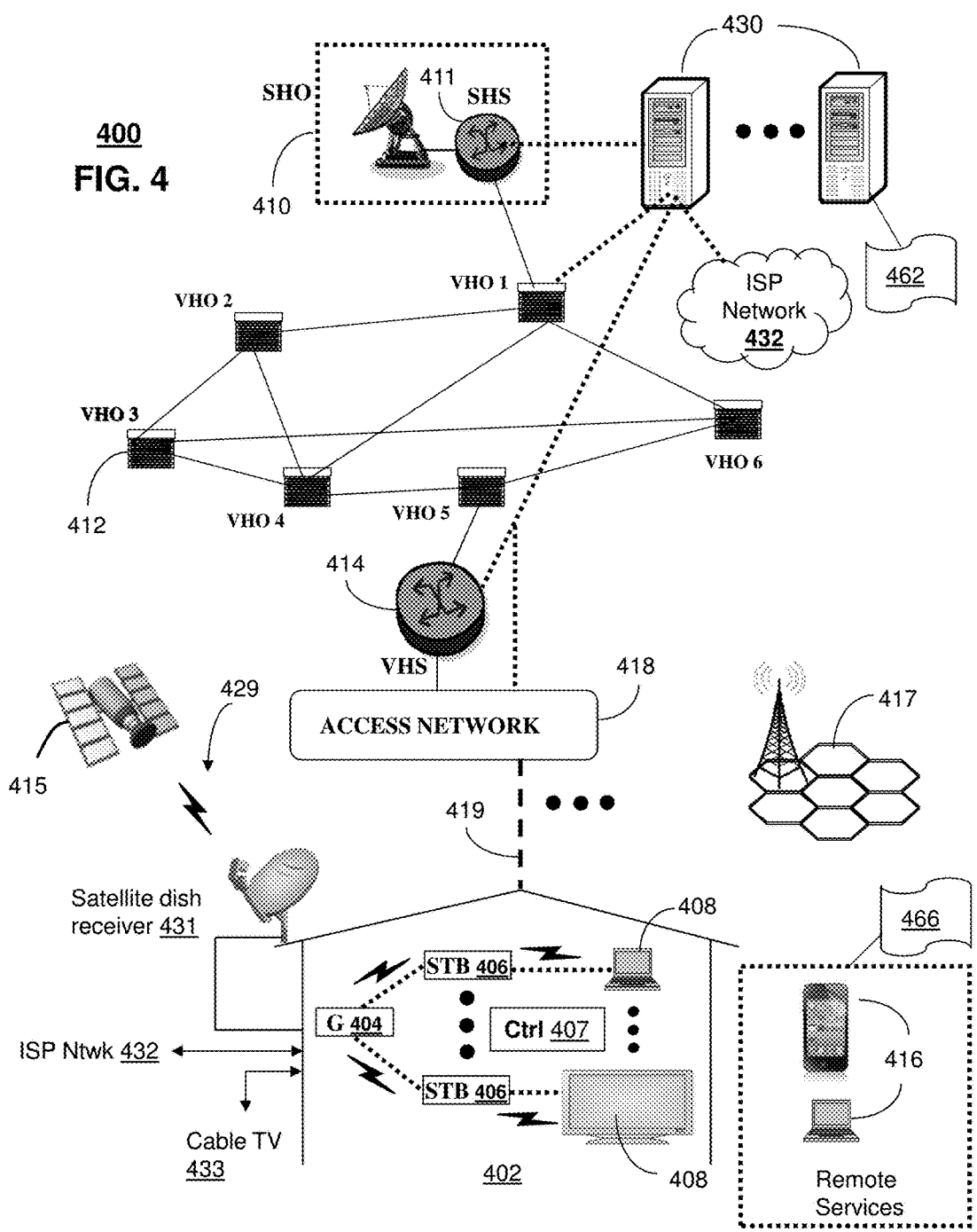
FIG. 4 depicts an illustrative embodiment of communication systems that provide media services to the systems 100 and 200 of FIGS. 1 and 2.

FIG. 4 depicts an illustrative embodiment of a first communication system 400 for delivering media content. The communication system 400 can represent an Internet Protocol Television (IPTV) media system. Communication system 400 can be overlaid or operably coupled with systems 100 and 200 of FIGS. 1 and 2 as another representative embodiment of communication system 400. For instance, one or more devices illustrated in the communication system 400 of FIG. 4 can perform operations including detecting a vehicle in proximity to a billboard, wherein the vehicle is determined to be facing the billboard, obtaining a demographic profile for an occupant of the vehicle, obtaining a directed advertisement for the vehicle based on the demographic profile of the occupant, generating a message for the vehicle based on the directed advertisement, and broadcasting the message to the vehicle, wherein an on-board device of the vehicle receives the message.

The IPTV media system can include a super head-end office (SHO) 410 with at least one super headend office server (SHS) 411 which receives media content from satellite and/or terrestrial communication systems. In the present context, media content can represent, for example, audio content, moving image content such as 2D or 3D videos, video games, virtual reality content, still image content, and combinations thereof. The SHS server 411 can forward packets associated with the media content to one or more video head-end servers (VHS) 414 via a network of video head-end offices (VHO) 412 according to a multicast communication protocol.

The VHS 414 can distribute multimedia broadcast content via an access network 418 to commercial and/or residential buildings 402 housing a gateway 404 (such as a residential or commercial gateway). The access network 418 can represent a group of digital subscriber line access multiplexers (DSLAMs) located in a central office or a service area interface that provide broadband services over fiber optical links or copper twisted pairs 419 to buildings 402. The gateway 404 can use communication technology to distribute broadcast signals to media processors 406 such as Set-Top Boxes (STBs) which in turn present broadcast channels to media devices 408 such as computers or television sets managed in some instances by a media controller 407 (such as an infrared or RF remote controller).

The gateway 404, the media processors 406, and media devices 408 can utilize tethered communication technologies (such as coaxial, powerline or phone line wiring) or can operate over a wireless access protocol such as Wireless Fidelity (WiFi), Bluetooth®, Zigbee®, or other present or next generation local or personal area wireless network technologies. By way of these interfaces, unicast communications can also be invoked between the media processors 406 and subsystems of the IPTV media system for services such as video-on-demand (VoD), browsing an electronic programming guide (EPG), or other infrastructure services.

A satellite broadcast television system 429 can be used in the media system of FIG. 4. The satellite broadcast television system can be overlaid, operably coupled with, or replace the IPTV system as another representative embodiment of communication system 400. In this embodiment, signals transmitted by a satellite 415 that include media content can be received by a satellite dish receiver 431 coupled to the building 402. Modulated signals received by the satellite dish receiver 431 can be transferred to the media processors 406 for demodulating, decoding, encoding, and/or distributing broadcast channels to the media devices 408. The media processors 406 can be equipped with a broadband port to an Internet Service Provider (ISP) network 432 to enable interactive services such as VoD and EPG as described above.

In yet another embodiment, an analog or digital cable broadcast distribution system such as cable TV system 433 can be overlaid, operably coupled with, or replace the IPTV system and/or the satellite TV system as another representative embodiment of communication system 400. In this embodiment, the cable TV system 433 can also provide Internet, telephony, and interactive media services. System 400 enables various types of interactive television and/or services including IPTV, cable and/or satellite.

The subject disclosure can apply to other present or next generation over-the-air and/or landline media content services system.

Some of the network elements of the IPTV media system can be coupled to one or more computing devices 430, a portion of which can operate as a web server for providing web portal services over the ISP network 432 to wireline media devices 408 or wireless communication devices 416.

Communication system 400 can also provide for all or a portion of the computing devices 430 to function as a targeted billboard system (herein referred to as targeted billboard system 430). The targeted billboard system 430 can use computing and communication technology to perform function 462, which can include among other things, the determination of targeted directed advertising or marketing materials for targeted vehicles of FIG. 3. For instance, function 462 of server 430 can be similar to the functions described network 218, media selector 226, and user profile server 224 of FIG. 2 as well as processing units 816 and 836 of FIGS. 8A and 8B respectively. The media processors 406 and wireless communication devices 416 can be provisioned with software function 466 to utilize the services of targeted billboard system 430. For instance, function 466 of wireless communication devices 416 can be similar to the functions described for providing the targeted directed advertising or marketing material to the communications devices of the vehicles drivers and/or passengers as described in Step 320 and obtaining notification of the access of the materials in Step 322 of FIG. 3. In other embodiments, function 466 can direct the signaling information to signaling elements 942, 944, and 946 of targeted code area 914 in FIGS. 9A, 9B, and 9C.

Multiple forms of media services can be offered to media devices over landline technologies such as those described above. Additionally, media services can be offered to media devices by way of a wireless access base station 417 operating according to common wireless access protocols such as Global System for Mobile or GSM, Code Division Multiple Access or CDMA, Time Division Multiple Access or TDMA, Universal Mobile Telecommunications or UMTS, World interoperability for Microwave or WiMAX, Software Defined Radio or SDR, Long Term Evolution or LTE, and so on. Other present and next generation wide area wireless access network technologies can be used in one or more embodiments of the subject disclosure.

Figure 5:
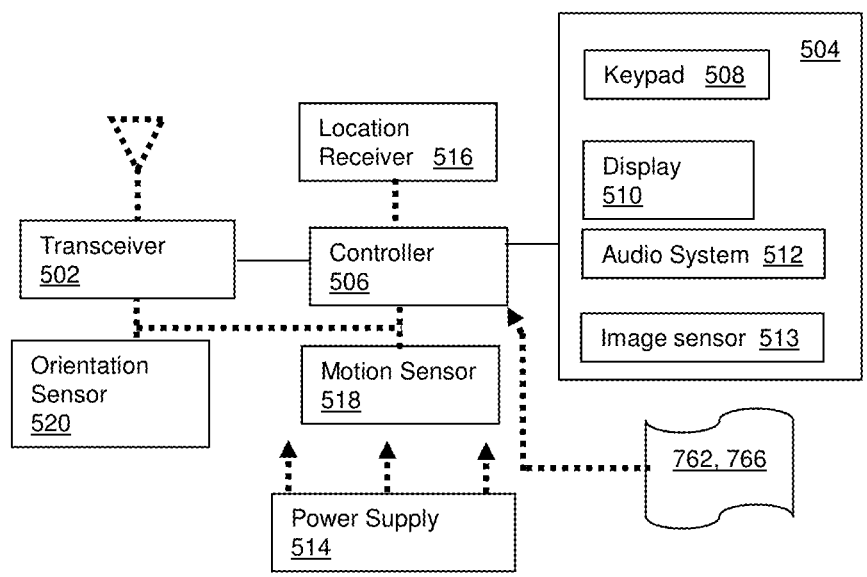
FIG. 5 depicts an illustrative embodiment of a communication device.
Figure 6:
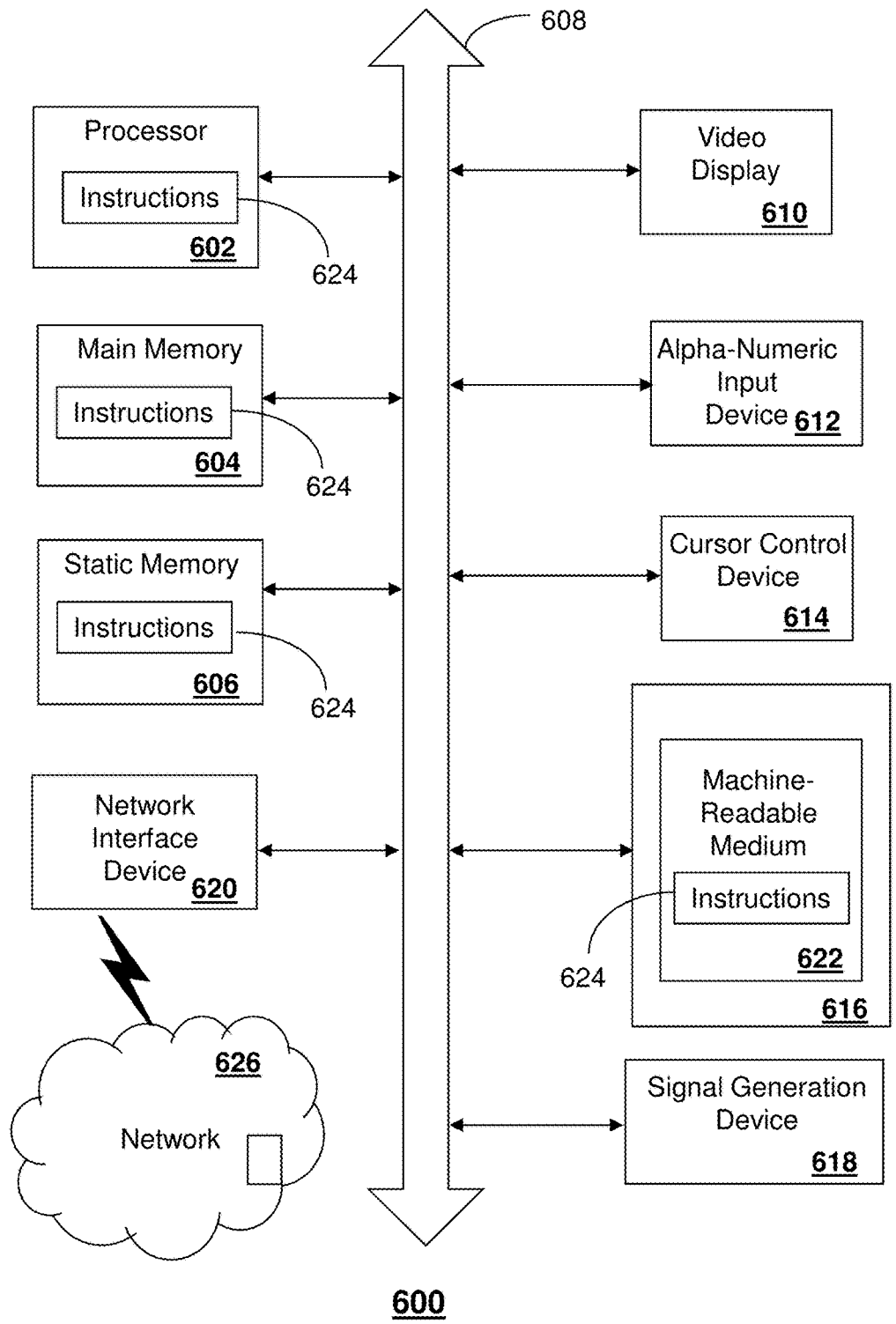
FIG. 6 is a diagrammatic representation of a machine in the form of a computer system within which a set of instructions, when executed, may cause the machine to perform any one or more of the methods described herein.

FIG. 5 depicts an illustrative embodiment of a communication device 500. Communication device 500 can serve in whole or in part as an illustrative embodiment of the devices depicted in systems 100 and 200 of FIGS. 1 and/or 2, such as media server 216, and function 466 of FIG. 4 and can be configured to perform portions of method 300 of FIG. 3, such as delivering the directed advertising or marketing material.

Communication device 500 can comprise a wireline and/or wireless transceiver 502 (herein transceiver 502), a user interface (UI) 504, a power supply 514, a location receiver 516, a motion sensor 518, an orientation sensor 520, and a controller 506 for managing operations thereof. The transceiver 502 can support short-range or long-range wireless access technologies such as Bluetooth®, ZigBee®, WiFi, DECT, or cellular communication technologies, just to mention a few (Bluetooth® and ZigBee® are trademarks registered by the Bluetooth® Special Interest Group and the ZigBee® Alliance, respectively). Cellular technologies can include, for example, CDMA-1x, UMTS/HSDPA, GSM/GPRS, TDMA/EDGE, EV/DO, WiMAX, SDR, LTE, as well as other next generation wireless communication technologies as they arise. The transceiver 502 can also be adapted to support circuit-switched wireline access technologies (such as PSTN), packet-switched wireline access technologies (such as TCP/IP, VoIP, etc.), and combinations thereof.

The UI 504 can include a depressible or touch-sensitive keypad 508 with a navigation mechanism such as a roller ball, a joystick, a mouse, or a navigation disk for manipulating operations of the communication device 500. The keypad 508 can be an integral part of a housing assembly of the communication device 500 or an independent device operably coupled thereto by a tethered wireline interface (such as a USB cable) or a wireless interface supporting for example Bluetooth®. The keypad 508 can represent a numeric keypad commonly used by phones, and/or a QWERTY keypad with alphanumeric keys. The UI 504 can further include a display 510 such as monochrome or color LCD (Liquid Crystal Display), OLED (Organic Light Emitting Diode) or other suitable display technology for conveying images to an end user of the communication device 500. In an embodiment where the display 510 is touch-sensitive, a portion or all of the keypad 508 can be presented by way of the display 510 with navigation features.

The display 510 can use touch screen technology to also serve as a user interface for detecting user input. As a touch screen display, the communication device 500 can be adapted to present a user interface with graphical user interface (GUI) elements that can be selected by a user with a touch of a finger. The touch screen display 510 can be equipped with capacitive, resistive or other forms of sensing technology to detect how much surface area of a user's finger has been placed on a portion of the touch screen display. This sensing information can be used to control the manipulation of the GUI elements or other functions of the user interface. The display 510 can be an integral part of the housing assembly of the communication device 500 or an independent device communicatively coupled thereto by a tethered wireline interface (such as a cable) or a wireless interface.

The UI 504 can also include an audio system 512 that utilizes audio technology for conveying low volume audio (such as audio heard in proximity of a human ear) and high volume audio (such as speakerphone for hands free operation). The audio system 512 can further include a microphone for receiving audible signals of an end user. The audio system 512 can also be used for voice recognition applications. The UI 504 can further include an image sensor 513 such as a charged coupled device (CCD) camera for capturing still or moving images.

The power supply 514 can utilize common power management technologies such as replaceable and rechargeable batteries, supply regulation technologies, and/or charging system technologies for supplying energy to the components of the communication device 500 to facilitate long-range or short-range portable applications. Alternatively, or in combination, the charging system can utilize external power sources such as DC power supplied over a physical interface such as a USB port or other suitable tethering technologies.

The location receiver 516 can utilize location technology such as a global positioning system (GPS) receiver capable of assisted GPS for identifying a location of the communication device 500 based on signals generated by a constellation of GPS satellites, which can be used for facilitating location services such as navigation. The motion sensor 518 can utilize motion sensing technology such as an accelerometer, a gyroscope, or other suitable motion sensing technology to detect motion of the communication device 500 in three-dimensional space. The orientation sensor 520 can utilize orientation sensing technology such as a magnetometer to detect the orientation of the communication device 500 (north, south, west, and east, as well as combined orientations in degrees, minutes, or other suitable orientation metrics).

The communication device 500 can use the transceiver 502 to also determine a proximity to a cellular, WiFi, Bluetooth®, or other wireless access points by sensing techniques such as utilizing a received signal strength indicator (RSSI) and/or signal time of arrival (TOA) or time of flight (TOF) measurements. The controller 506 can utilize computing technologies such as a microprocessor, a digital signal processor (DSP), programmable gate arrays, application specific integrated circuits, and/or a video processor with associated storage memory such as Flash, ROM, RAM, SRAM, DRAM or other storage technologies for executing computer instructions, controlling, and processing data supplied by the aforementioned components of the communication device 500.

Other components not shown in FIG. 5 can be used in one or more embodiments of the subject disclosure. For instance, the communication device 500 can include a reset button (not shown). The reset button can be used to reset the controller 506 of the communication device 500. In yet another embodiment, the communication device 500 can also include a factory default setting button positioned, for example, below a small hole in a housing assembly of the communication device 500 to force the communication device 500 to re-establish factory settings. In this embodiment, a user can use a protruding object such as a pen or paper clip tip to reach into the hole and depress the default setting button. The communication device 500 can also include a slot for adding or removing an identity module such as a Subscriber Identity Module (SIM) card. SIM cards can be used for identifying subscriber services, executing programs, storing subscriber data, and so forth.

The communication device 500 as described herein can operate with more or less of the circuit components shown in FIG. 5. These variant embodiments can be used in one or more embodiments of the subject disclosure.

The communication device 500 can be adapted to perform the functions of systems 100 and 200 of FIGS. 1 and/or 2 and function 466 of FIG. 4 and can be configured to perform portions of method 300 of FIG. 3, such as delivering the directed advertising or marketing material. It will be appreciated that the communication device 500 can also represent other devices that can operate in systems 100 and 200 of FIGS. 1 and/or 2 and function 466 of FIG. 4 such as a gaming console and a media player. In addition, the controller 506 can be adapted in various embodiments to perform the functions 462 and 466, respectively. In additional embodiments, image sensor 513 can receive the images from digital billboard 122 of FIG. 1 and thus retrieve the directed information directly.

Upon reviewing the aforementioned embodiments, it would be evident to an artisan with ordinary skill in the art that said embodiments can be modified, reduced, or enhanced without departing from the scope of the claims described below. For example, in some embodiments, the vehicle is known and is able to discretely recognize directed images from the targeted billboard intended only for that vehicle. Thus, in some embodiments, the vehicle can ignore directed images not intended for that vehicle and its drives and/or passengers. In some embodiments, the vehicle and its drives and/or passengers can be presented with each of the directed images and be presented with a selection to choose which one best fits them. In future iterations, the imaging systems of the vehicle and its drives and/or passengers can then ignore unrelated directed images from the directed billboard system. Other embodiments can be used in the subject disclosure.

It should be understood that devices described in the exemplary embodiments can be in communication with each other via various wireless and/or wired methodologies. The methodologies can be links that are described as coupled, connected and so forth, which can include unidirectional and/or bidirectional communication over wireless paths and/or wired paths that utilize one or more of various protocols or methodologies, where the coupling and/or connection can be direct (e.g., no intervening processing device) and/or indirect (e.g., an intermediary processing device such as a router).

FIG. 8 depicts an exemplary diagrammatic representation of a machine in the form of a computer system 800 within which a set of instructions, when executed, may cause the machine to perform any one or more of the methods described above. One or more instances of the machine can operate, for example, as the targeted billboard system 430, the media selector 228, and the user profile server 224, and audience detector 106. In some embodiments, the machine may be connected (e.g., using a network 626) to other machines. In a networked deployment, the machine may operate in the capacity of a server or a client user machine in a server-client user network environment, or as a peer machine in a peer-to-peer (or distributed) network environment.

The machine may comprise a server computer, a client user computer, a personal computer (PC), a tablet, a smart phone, a laptop computer, a desktop computer, a control system, a network router, switch or bridge, or any machine capable of executing a set of instructions (sequential or otherwise) that specify actions to be taken by that machine. It will be understood that a communication device of the subject disclosure includes broadly any electronic device that provides voice, video or data communication. Further, while a single machine is illustrated, the term "machine" shall also be taken to include any collection of machines that individually or jointly execute a set (or multiple sets) of instructions to perform any one or more of the methods discussed herein.

The computer system 600 may include a processor (or controller) 602 (e.g., a central processing unit (CPU)), a graphics processing unit (GPU, or both), a main memory 604 and a static memory 606, which communicate with each other via a bus 608. The computer system 600 may further include a display unit 610 (e.g., a liquid crystal display (LCD), a flat panel, or a solid state display). The computer system 600 may include an input device 612 (e.g., a keyboard), a cursor control device 614 (e.g., a mouse), a disk drive unit 616, a signal generation device 618 (e.g., a speaker or remote control) and a network interface device 620. In distributed environments, the embodiments described in the subject disclosure can be adapted to utilize multiple display units 610 controlled by two or more computer systems 600. In this configuration, presentations described by the subject disclosure may in part be shown in a first of the display units 610, while the remaining portion is presented in a second of the display units 610.

The disk drive unit 616 may include a tangible computer-readable storage medium 622 on which is stored one or more sets of instructions (e.g., software 624) embodying any one or more of the methods or functions described herein, including those methods illustrated above. The instructions 624 may also reside, completely or at least partially, within the main memory 604, the static memory 606, and/or within the processor 602 during execution thereof by the computer system 600. The main memory 604 and the processor 602 also may constitute tangible computer-readable storage media.

Dedicated hardware implementations including, but not limited to, application specific integrated circuits, programmable logic arrays and other hardware devices can likewise be constructed to implement the methods described herein. Application specific integrated circuits and programmable logic array can use downloadable instructions for executing state machines and/or circuit configurations to implement embodiments of the subject disclosure. Applications that may include the apparatus and systems of various embodiments broadly include a variety of electronic and computer systems. Some embodiments implement functions in two or more specific interconnected hardware modules or devices with related control and data signals communicated between and through the modules, or as portions of an application-specific integrated circuit. Thus, the example system is applicable to software, firmware, and hardware implementations.

In accordance with various embodiments of the subject disclosure, the operations or methods described herein are intended for operation as software programs or instructions running on or executed by a computer processor or other computing device, and which may include other forms of instructions manifested as a state machine implemented with logic components in an application specific integrated circuit or field programmable gate array. Furthermore, software implementations (e.g., software programs, instructions, etc.) including, but not limited to, distributed processing or component/object distributed processing, parallel processing, or virtual machine processing can also be constructed to implement the methods described herein. Distributed processing environments can include multiple processors in a single machine, single processors in multiple machines, and/or multiple processors in multiple machines. It is further noted that a computing device such as a processor, a controller, a state machine or other suitable device for executing instructions to perform operations or methods may perform such operations directly or indirectly by way of one or more intermediate devices directed by the computing device.

While the tangible computer-readable storage medium 622 is shown in an example embodiment to be a single medium, the term "tangible computer-readable storage medium" should be taken to include a single medium or multiple media (e.g., a centralized or distributed database, and/or associated caches and servers) that store the one or more sets of instructions. The term "tangible computer-readable storage medium" shall also be taken to include any non-transitory medium that is capable of storing or encoding a set of instructions for execution by the machine and that cause the machine to perform any one or more of the methods of the subject disclosure. The term "non-transitory" as in a non-transitory computer-readable storage includes without limitation memories, drives, devices and anything tangible but not a signal per se.

The term "tangible computer-readable storage medium" shall accordingly be taken to include, but not be limited to: solid-state memories such as a memory card or other package that houses one or more read-only (non-volatile) memories, random access memories, or other re-writable (volatile) memories, a magneto-optical or optical medium such as a disk or tape, or other tangible media which can be used to store information. Accordingly, the disclosure is considered to include any one or more of a tangible computer-readable storage medium, as listed herein and including art-recognized equivalents and successor media, in which the software implementations herein are stored.

Although the present specification describes components and functions implemented in the embodiments with reference to particular standards and protocols, the disclosure is not limited to such standards and protocols. Each of the standards for Internet and other packet switched network transmission (e.g., TCP/IP, UDP/IP, HTML, HTTP) represent examples of the state of the art. Such standards are from time-to-time superseded by faster or more efficient equivalents having essentially the same functions. Wireless standards for device detection (e.g., RFID), short-range communications (e.g., Bluetooth®, WiFi, Zigbee®), and long-range communications (e.g., WiMAX, GSM, CDMA, LTE) can be used by computer system 600. In one or more embodiments, information regarding use of services can be generated including services being accessed, media consumption history, user preferences, and so forth. This information can be obtained by various methods including user input, detecting types of communications (e.g., video content vs. audio content), analysis of content streams, and so forth. The generating, obtaining and/or monitoring of this information can be responsive to an authorization provided by the user.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. The exemplary embodiments can include combinations of features and/or steps from multiple embodiments. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense.

Although specific embodiments have been illustrated and described herein, it should be appreciated that any arrangement which achieves the same or similar purpose may be substituted for the embodiments described or shown by the subject disclosure. The subject disclosure is intended to cover any and all adaptations or variations of various embodiments. Combinations of the above embodiments, and other embodiments not specifically described herein, can be used in the subject disclosure. For instance, one or more features from one or more embodiments can be combined with one or more features of one or more other embodiments. In one or more embodiments, features that are positively recited can also be negatively recited and excluded from the embodiment with or without replacement by another structural and/or functional feature. The steps or functions described with respect to the embodiments of the subject disclosure can be performed in any order. The steps or functions described with respect to the embodiments of the subject disclosure can be performed alone or in combination with other steps or functions of the subject disclosure, as well as from other embodiments or from other steps that have not been described in the subject disclosure. Further, more than or less than all of the features described with respect to an embodiment can also be utilized.

Less than all of the steps or functions described with respect to the exemplary processes or methods can also be performed in one or more of the exemplary embodiments. Further, the use of numerical terms to describe a device, component, step or function, such as first, second, third, and so forth, is not intended to describe an order or function unless expressly stated so. The use of the terms first, second, third and so forth, is generally to distinguish between devices, components, steps or functions unless expressly stated otherwise. Additionally, one or more devices or components described with respect to the exemplary embodiments can facilitate one or more functions, where the facilitating (e.g., facilitating access or facilitating establishing a connection) can include less than every step needed to perform the function or can include all of the steps needed to perform the function.

In one or more embodiments, a processor (which can include a controller or circuit) has been described that performs various functions. It should be understood that the processor can be multiple processors, which can include distributed processors or parallel processors in a single machine or multiple machines. The processor can be used in supporting a virtual processing environment. The virtual processing environment may support one or more virtual machines representing computers, servers, or other computing devices. In such virtual machines, components such as microprocessors and storage devices may be virtualized or logically represented. The processor can include a state machine, application specific integrated circuit, and/or programmable gate array including a Field PGA. In one or more embodiments, when a processor executes instructions to perform "operations", this can include the processor performing the operations directly and/or facilitating, directing, or cooperating with another device or component to perform the operations.

The Abstract of the Disclosure is provided with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method, the method comprising:
   obtaining, by a processing system comprising a processor, images of a traffic flow near a billboard, wherein the billboard presents a first image;
   identifying, by the processing system, a vehicle in the traffic flow;
   generating, by the processing system, a marketing profile for an occupant of the vehicle according to marketing parameters for the occupant;
   generating, by the processing system, directed advertisement for the occupant according to the marketing profile;
   generating, by the processing system, a second image to be displayed on the billboard, wherein the second image includes a code to be obtained by the vehicle, the code indicating that the directed advertisement is directed exclusively for the vehicle, and wherein equipment of the vehicle observes the code and receives the directed advertisement based on the code and presents the directed advertisement to occupants of the vehicle; and
   receiving, by the processing system, an automatic notification that the directed advertisement has been presented to the occupants of the vehicle.

2. The method of claim 1, further comprising:
   receiving, by the processing system, a confirmation from equipment of the vehicle that the directed advertisement has been presented to the occupants of the vehicle;
   determining that the vehicle is previously unknown to the processing system; and
   generating, by the processing system, a marketing profile for the vehicle based on the directed advertisement.

3. The method of claim 2, further comprising updating a marketing profile for the occupant based on the automatic notification.

4. The method of claim 2, wherein the identifying comprises detecting an identifying feature of the vehicle, wherein the identifying feature identifies a specific marketing profile for the occupant.

5. A machine-readable storage medium, comprising executable instructions that, when executed by a processing system including a processor, facilitate performance of operations, comprising:
   receiving first image data from a first billboard including an image of a vehicle in a location at a viewing position of the first billboard, wherein the first billboard comprises a first camera unit to record the first image data;
   determining a demographic and psychographic profile for homeowners and renters in a geographic area near the first billboard;
   estimating, by the processing system, demographic information for an occupant of the vehicle based on the demographic and psychographic profile;
   analyzing the estimated demographic information to determine a marketing profile for the vehicle;
   determining a first directed marketing message for the vehicle according to the marketing profile;
   generating personalized coded information for the vehicle, wherein the personalized coded information indicates that the first directed marketing message is intended exclusively for the vehicle;
   providing the first directed marketing message and the personalized coded information to the first billboard, wherein the first billboard provides a message and the personalized coded information to the vehicle to access the first directed marketing message via equipment of the vehicle, wherein the first billboard proves the message and the personalized coded information to one or more selected signaling elements of a plurality of signaling elements, each respective signaling element of the plurality of signaling elements being directed at a respective viewing area, the one or more selected signaling elements being selected by the processing system based on the location of the vehicle at the viewing position to provide the message and the personalized coded information to the location of the vehicle when the location of the vehicle at the viewing position matches a selected respective viewing area; and
   receiving an automatic notification from the vehicle, wherein the automatic notification indicates that the first directed marketing message has been accessed at the vehicle.

6. The machine-readable storage medium of claim 5, wherein the billboard comprises a display device configured to display a first marketing image and a second image comprising the message, and wherein the directed marketing message is related to the first marketing image.

7. The machine-readable storage medium of claim 5, wherein the operations further comprise:
   storing the marketing profile for the vehicle;
   receiving second image data from a second billboard including an image of a traffic flow in a viewing position of the second billboard, wherein the second billboard comprises a second camera unit to record the second image data, wherein the second billboard comprises a main advertising message and a second display device;
   detecting the vehicle among the second image data;
   responsive to the detecting the vehicle among the second image data, generating a second directed marketing message according to the marketing profile for the vehicle; and
   providing the directed marketing message and the personalized coded information to the second billboard, wherein the second billboard provides a second message and the personalized coded information through the second display device to the vehicle to access the second directed marketing message via the equipment of the vehicle.

8. The machine-readable storage medium of claim 7, wherein the first directed marketing message is related to a first marketing image of the first billboard, and wherein the second directed marketing message is related to the main advertising message of the second billboard.

9. The machine-readable storage medium of claim 5, wherein the marketing profile is based on demographic information and psychographic information for an owner of the vehicle.

10. A device, comprising:

a processing system including a processor; and a memory that stores executable instructions that, when executed by the processing system, facilitate performance of operations, comprising:

obtaining, by the processing system, images of a traffic flow near a billboard, wherein the billboard presents a first image;

identifying, by the processing system, a vehicle in the traffic flow;

estimating, by the processing system, demographic information for an occupant of the vehicle based on a demographic and psychographic profile for homeowners and renters in a geographic area near the billboard;

generating, by the processing system, a marketing profile for an the occupant of the vehicle according to marketing parameters and the estimated demographic information for the occupant;

generating, by the processing system, a directed advertisement for the occupant according to the marketing profile;

generating, by the processing system, a second image to be displayed on the billboard, wherein the second image includes a code to be obtained by the vehicle, wherein the generating the second image comprises providing the second image to one or more selected signaling elements of a plurality of signaling elements of the billboard, each respective signaling element of the plurality of signaling elements being directed at a respective viewing area, the one or more selected signaling elements being selected by the processing system based on a location of the vehicle to provide the second image to the location of the vehicle when the location of the vehicle matches a selected respective viewing area, the code indicating that the directed advertisement is directed exclusively for the vehicle, and wherein equipment of the vehicle observes the code and receives the directed advertisement based on the code and presents the directed advertisement to occupants of the vehicle; and receiving, by the processing system, an automatic notification that the directed advertisement has been presented to the occupants of the vehicle.

11. The device of claim 10, wherein the operations further comprise:

receiving, by the processing system, a confirmation from the equipment of the vehicle that the directed advertisement has been presented to the occupants of the vehicle;

determining that the vehicle is previously unknown to the processing system; and generating, by the processing system, a marketing profile for the vehicle based on the directed advertisement.

12. The device of claim 11, wherein the operations further comprise updating a marketing profile for the occupant based on the automatic notification.

13. The device of claim 11, wherein the identifying comprises detecting an identifying feature of the vehicle, wherein the identifying feature identifies a specific marketing profile for the occupant.

14. The device of claim 10, wherein the billboard comprises a display device configured to display the first image and the second image comprising a message, and wherein the directed advertisement is related to the first image.

15. The device of claim 10, wherein the operations further comprise:

storing the marketing profile for the occupant of the vehicle;

receiving second images from a second billboard including images of a traffic flow in a viewing position of the second billboard, wherein the second billboard comprises a camera unit to record the second images, wherein the second billboard comprises a main advertising message and a second display device;

detecting the vehicle among the second images;

responsive to the detecting the vehicle among the second images, generating a second directed advertisement according to the marketing profile for occupant of the vehicle; and providing the second directed advertisement and the code to the second billboard, wherein the second billboard provides a second message and the code through the second display device to the vehicle to access the second directed advertisement via the equipment of the vehicle.

16. The device of claim 15, wherein the directed advertisement is related to a first marketing image of the billboard, and wherein the second directed advertisement is related to the main advertising message of the second billboard.

17. The device of claim 10, wherein the marketing profile is based on demographic information and psychographic information for an owner of the vehicle.

18. The device of claim 10, wherein the identifying the vehicle comprises obtaining a visual image of the vehicle.

19. The device of claim 18, wherein the visual image of the vehicle includes an image of a driver of the vehicle.

20. The device of claim 19, wherein the visual image of the vehicle includes an image of a passenger of the vehicle.

* * * * *